(12) United States Patent
Kawaura (10) Patent No.: US 9,261,944 B2
(45) Date of Patent: Feb. 16, 2016

(54) INFORMATION PROCESSING APPARATUS, CONTROL METHOD, AND RECORDING MEDIUM STORING A CONTROL PROGRAM

(71) Applicant: Hisanori Kawaura, Kanagawa (JP)

(72) Inventor: Hisanori Kawaura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/592,055

(22) Filed: Jan. 8, 2015

(65) Prior Publication Data

US 2015/0199000 A1 Jul. 16, 2015

(30) Foreign Application Priority Data

Jan. 16, 2014 (JP) ................. 2014-005972

(51) Int. Cl.
*G06F 1/32* (2006.01)
*H04N 1/00* (2006.01)

(52) U.S. Cl.
CPC .......... *G06F 1/3234* (2013.01); *H04N 1/00896* (2013.01); *H04N 2201/0094* (2013.01)

(58) Field of Classification Search
CPC ...... B41J 29/393; B41J 2/175; B41J 2/17596; B41J 2/18; G03G 15/5004; G03G 15/5091; G03G 15/5087; G03G 2215/00109; G03G 15/502; G03G 15/5083; G03G 15/55; G03G 15/80; G03G 15/50
USPC .............. 358/1.13, 1.15, 1.14, 1.16, 1.4, 401, 358/514, 520; 713/320, 310, 300; 235/382, 235/375; 347/14, 17, 22, 29; 399/335, 38, 399/46, 75, 80, 81, 88, 89; 714/E11.023, 23
See application file for complete search history.

(56) References Cited

U.S. PATENT DOCUMENTS

| | | | | |
|---|---|---|---|---|
| 6,330,083 B1 * | 12/2001 | Nabeshima et al. | .......... | 358/474 |
| 6,915,085 B2 * | 7/2005 | Kawaura | .......... | 399/8 |
| 7,460,800 B2 * | 12/2008 | Yamauchi et al. | .......... | 399/38 |
| 7,593,121 B2 * | 9/2009 | Kobayashi et al. | .......... | 358/1.13 |
| 7,644,288 B2 * | 1/2010 | Kawaura et al. | .......... | 713/191 |
| 7,715,028 B2 * | 5/2010 | Kawaura | .......... | 358/1.13 |
| 7,855,798 B2 * | 12/2010 | Toyoda | .......... | 358/1.15 |
| 8,322,609 B2 * | 12/2012 | Hashimoto | .......... | 235/382 |
| 8,526,040 B2 * | 9/2013 | Okada et al. | .......... | 358/1.15 |
| 2005/0156571 A1 * | 7/2005 | Inui et al. | .......... | 320/132 |
| 2006/0210289 A1 * | 9/2006 | Yamauchi et al. | .......... | 399/38 |
| 2006/0271802 A1 * | 11/2006 | Yanagawa | .......... | 713/300 |
| 2010/0127076 A1 * | 5/2010 | Hashimoto | .......... | 235/382 |
| 2010/0276662 A1 * | 11/2010 | Colinge | .......... | 257/9 |

(Continued)

FOREIGN PATENT DOCUMENTS

| | | |
|---|---|---|
| JP | 8-297598 | 11/1996 |
| JP | 2009-199317 | 9/2009 |

(Continued)

*Primary Examiner* — Negussie Worku
(74) *Attorney, Agent, or Firm* — Harness, Dickey & Pierce, P.L.C.

(57) ABSTRACT

A novel information processing apparatus includes an energy-saving mode controller that controls the information processing apparatus in an energy-saving mode, and a restart controller that restarts the energy-saving mode controller each time a predetermined value is counted using a counter. The energy-saving mode controller resets a counter in the restart controller based on information output in a shorter cycle than counting of the predetermined value by the counter in accordance with an operating mode of the information processing apparatus.

9 Claims, 9 Drawing Sheets

(56) References Cited

U.S. PATENT DOCUMENTS

| | | | |
|---|---|---|---|
| 2010/0290085 A1* | 11/2010 | Okada et al. | 358/1.15 |
| 2014/0003832 A1* | 1/2014 | Atarashi | 399/88 |
| 2015/0109632 A1* | 4/2015 | Imamura | 358/1.13 |
| 2015/0199000 A1* | 7/2015 | Kawaura | 358/1.14 |

FOREIGN PATENT DOCUMENTS

| | | |
|---|---|---|
| JP | 2010-072798 | 4/2010 |
| JP | 2011-163262 | 8/2011 |

* cited by examiner

| | PCI ADDRESS | SUB-CPU ADDRESS | CATEGORY | DETAIL | REMARKS |
|---|---|---|---|---|---|
| BAR3 | +0×01FF FFFF − +0×0000 0000 | 0×1FFF FFFF − 0×1E00 0000 | ROM | | ROM SPACE FOR SUB-CPU |
| | | 0×1DFF FFFF − 0×1A01 0000 | UNUSED | UNUSED | |
| BAR0 | +0×0000 FFFF − +0×0000 0000 | 0×1A00 FFFF − 0×1A00 0000 | REGISTER | INTERNAL REGISTER | ASIC INTERNAL CONTROLLER (CONTROL NIC AND USB) |
| | | 0×19FF FFFF − 0×1000 0600 | UNUSED | UNUSED | |
| BAR1 | +0×0000 05FF − +0×0000 0000 | 0×1000 05FF − 0×1000 0000 | SHARED RAM | SHARED RAM FOR COMMUNICATION | MEMORY FOR COMMUNICATION BETWEEN MAIN CPU AND SUB-CPU |
| | | 0×0FFF FFFF − 0×0010 0000 | UNUSED | UNUSED | |
| BAR2 | +0×000F FFFF − +0×0000 0000 | 0×000F FFFF − 0×0000 0000 | MEMORY | INTERNAL SRAM | MEMORY FOR SUB-CPU EMBEDDED IN ASIC |

FIG. 8

INFORMATION PROCESSING APPARATUS, CONTROL METHOD, AND RECORDING MEDIUM STORING A CONTROL PROGRAM

CROSS-REFERENCE TO RELATED APPLICATION

This patent application is based on and claims priority pursuant to 35 U.S.C. §119 to Japanese Patent Application No. 2014-005972, filed on Jan. 16, 2014 in the Japan Patent Office, the entire disclosure of which is hereby incorporated by reference herein.

BACKGROUND

1. Technical Field

The present invention relates to an information processing apparatus, a control method performed by the information processing apparatus, and recording medium storing a control program for controlling the information processing apparatus.

2. Background Art

As demand for more energy-efficient devices continues to climb, it is critical that information processing apparatuses having one or more Central Processing Units (CPUs) have the ability to save energy by stopping power to individual units in the information processing apparatus in response to the operating state of the apparatus.

A Suspend To RAM (STR) mode that stops supplying power other than to a Random Access Memory (RAM) as a main storage device is an example of the energy-saving control described above.

SUMMARY

An example embodiment of the present invention provides a novel information processing apparatus that includes an energy-saving mode controller that controls the information processing apparatus in an energy-saving mode, and a restart controller that restarts the energy-saving mode controller each time a predetermined value is counted using a counter. The energy-saving mode controller resets a counter in the restart controller based on information output in a shorter cycle than counting of the predetermined value in accordance with an operating mode of the information processing apparatus.

Further example embodiments of the present invention provide a method of controlling an information processing apparatus, and a non-transitory recording medium storing a control program for controlling the information processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In addition to stopping power supply to save energy, it is also critical to be able to recover from the energy-saving mode if necessary. However, in energy-saving control using the STR mode, since power to the CPU is also stopped, it is impossible to recover from the energy-saving mode using packets such as network packets, and it is impossible to recover from the energy-saving state quickly in some cases.

To cope with this issue, a sub-CPU with low power consumption is included to supply power to the sub-CPU even in the energy-saving mode. As a result, an application that runs under the control of the sub-CPU monitors that the packets are received, and the application recovers the apparatus from the energy-saving mode in accordance with the received packets.

In an information processing apparatus with the sub-CPU described above, if an energy-saving mode controller that controls the information processing apparatus in the energy-saving mode including a sub-CPU and the application that runs under the control of the sub-CPU has trouble, it is impossible to recover from the energy-saving mode. Therefore, it is necessary to keep the energy-saving mode controller working constantly.

Figure 1:
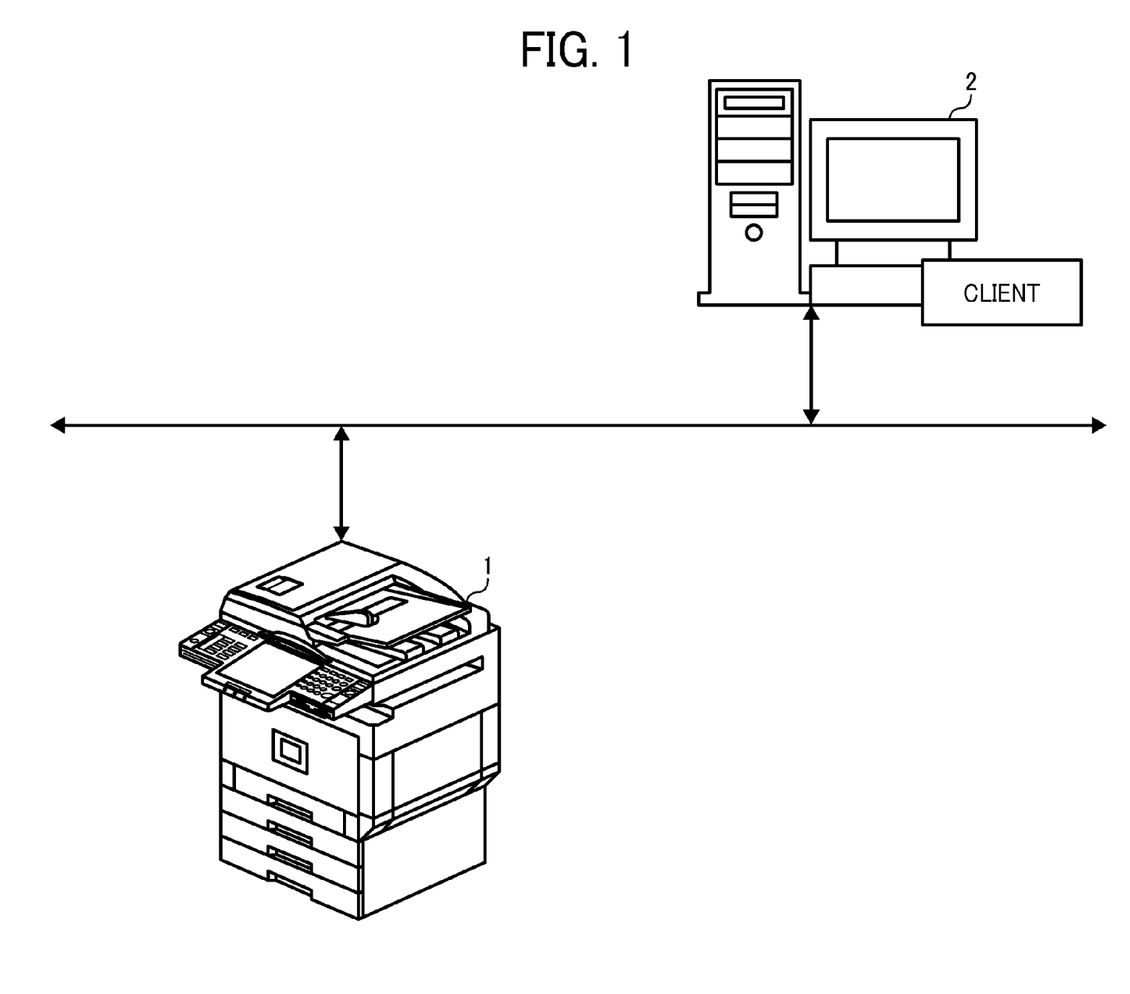
FIG. 1 is a schematic diagram illustrating an image forming system as an embodiment of the present invention.

FIG. 1 is a schematic diagram illustrating an image forming system in this embodiment. The image forming system in this embodiment includes an image forming apparatus 1 and a client device 2. In the present embodiment, the image processing apparatus 1 is a multifunction peripheral (MFP) that implements multiple capabilities such as a printer, scanner, and facsimile etc. The client device 2 is an information processing device such as a personal computer (PC) operated by user operation.

In this embodiment, the image forming apparatus 1 is taken as an example of an information processing apparatus capable of transitioning to an energy-saving mode by stopping the supply of power to a part of the apparatus.

Figure 2:
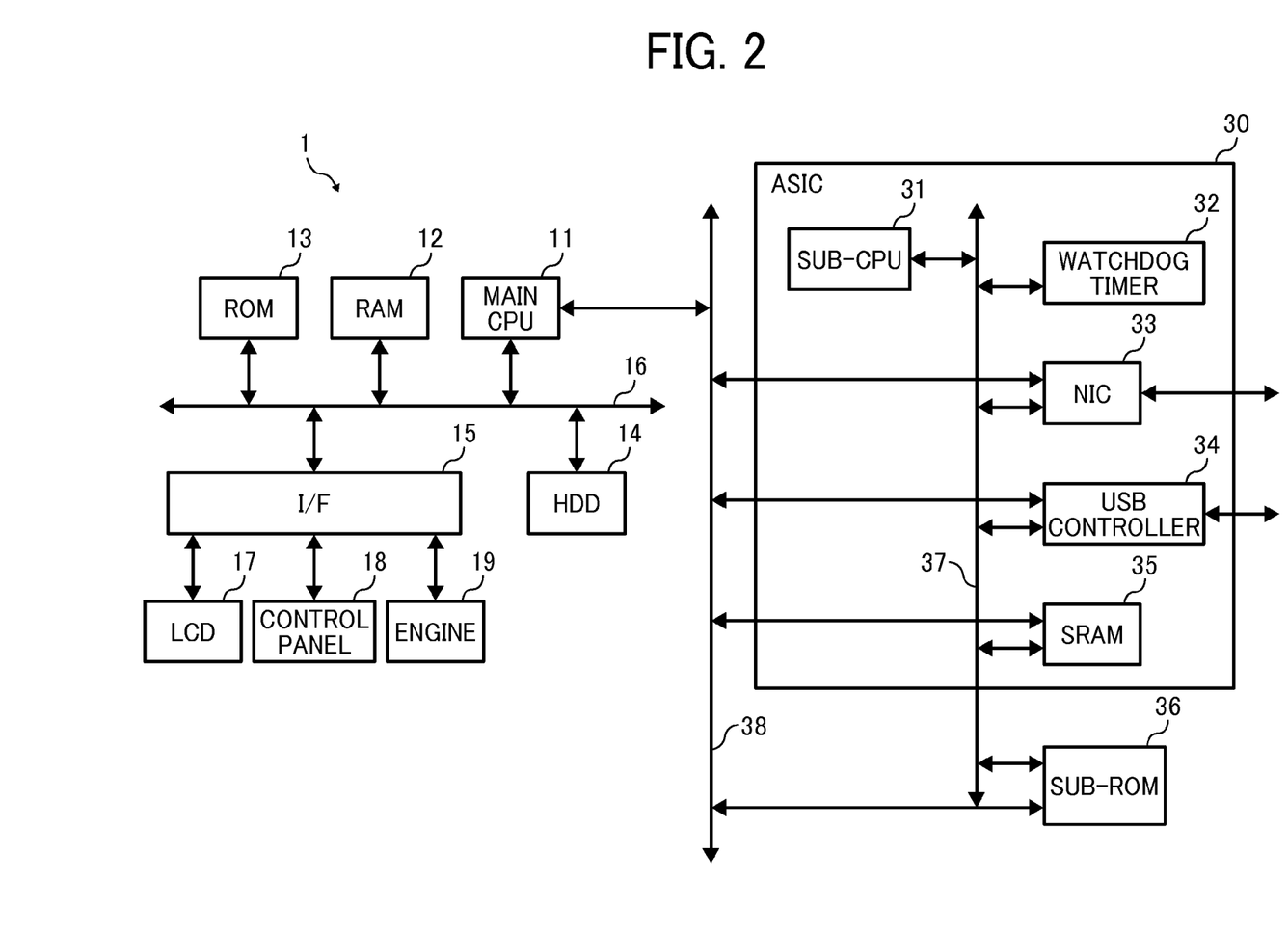
FIG. 2 is a block diagram illustrating a hardware configuration of an image forming apparatus as an embodiment of the present invention.

FIG. 2 is a block diagram illustrating a hardware configuration of an image forming apparatus in this embodiment. As shown in FIG. 2, the image forming apparatus 1 in this embodiment includes a main CPU 11, a Random Access Memory (RAM) 12, a Read Only Memory (ROM) 13, a hard disk drive (HDD) 14, an interface (I/F) 15, a Liquid Crystal Display (LCD) 17, a control panel 18, an engine 19, an Application Specific Integrated Circuit (ASIC) 30, and a sub-ROM 36. In addition, the main CPU 11, the RAM 12, the ROM 13, the HDD 14, and the I/F 15 are connected with each other via a bus 16. In addition, the LCD 17, the control panel 18, and the engine 19 are connected to the I/F 15.

In the ASIC 30, a sub-CPU 31, a watchdog timer 32, a Network Interface Controller (NIC) 33, a Universal Serial Bus (USB) controller 34, and a Static RAM (SRAM) 35. Those units included in the ASIC 30 and a sub-ROM 36 are connected with each other via a bus 37. Furthermore, the main CPU 11, the NIC 33, the USB controller 34, the SRAM 35, and the sub-ROM 36 are connected with each other via a bus 38. It should be noted that the main CPU 11 can be included in System-on-a-chip (SOC).

The main CPU 11 is a processing unit (processor) that controls the whole operation of the image forming apparatus 1 if the power is supplied (i.e., if the image forming apparatus 1 is not in the energy-saving mode). The sub-CPU 31 is a processing unit that controls the operation of the image forming apparatus 1 in the energy-saving mode when power supply to the main CPU 11 is stopped. Since only a part of the image forming apparatus 1 works in the energy-saving mode, the sub-CPU 31 needs only enough processing capability (processing power) to control only that part of the image forming apparatus 1 that works in the energy-saving mode. Therefore, a sub-CPU that consumes less power than the main CPU, which needs a processing capability that can control the whole image forming apparatus 1, can be used.

The RAM 12 is a volatile storage device that can read/write information at high speed and is used as a work area when the main CPU 11 processes information. The ROM 13 is a read-only non-volatile storage medium and stores programs such as firmware. The HDD 14 is a non-volatile storage medium that can read/write information and stores the operating system (OS), various control programs, and application programs etc.

The I/F 15 connects the bus 16 with various hardware and networks, etc., and controls them. The LCD 17 is a visual user interface to check status of the image forming apparatus 1. The control panel 18 is a user interface such as a keyboard, mouse, and touch panel to input information to the image forming apparatus 1 by user operation. The engine 19 is a configuration that implements capabilities such as the scanner and printer, etc., included in the image processing apparatus 1.

The watchdog timer 32 works in the energy-saving mode and counts down a value. The watchdog timer 32 resets the counter under the control of a counter controller 202 (described later) and restarts a sub-controller 200 (described later) that works in the energy-saving mode if the counter is not reset until the counter reaches a predetermined value (described in detail later in the description of the counter controller 202).

The NIC 33 controls communication with other devices such as the client device 2 connected via a network such as Ethernet and Local Area Network (LAN). The USB controller 34 controls data transmission/reception with other devices such as the client device 2 connected via USB. The SRAM 35 is a volatile storage device and is used as a work area when the sub-CPU 31 processes information. In addition, a storage area that the main CPU 11 and the sub-CPU 31 can share is allocated in the SRAM 35.

The sub-ROM 36 is a read-only non-volatile storage medium and stores application programs etc. that runs under the control of the sub-CPU 31. The NIC 33, the USB controller 34, the SRAM 35 and the sub-ROM 36 are controlled by the main CPU 11 if the main CPU 11 is powered. If the main CPU 11 is not powered, the NIC 33, the USB controller 34, the SRAM 35 and the sub-ROM 36 are controlled by the sub-CPU 31

In this hardware configuration described above, programs stored in storage devices such as the ROM 13, HDD 14, the sub-ROM 36, and optical discs are read to the RAM 12 and SRAM 35, and a software controlling unit is constructed by executing operation in accordance with the programs by the main CPU 11 and the sub-CPU 31. Functional blocks that implement capabilities of the image forming apparatus 1 of this embodiment are constructed by a combination of the software controlling units described above and hardware.

Figure 3:
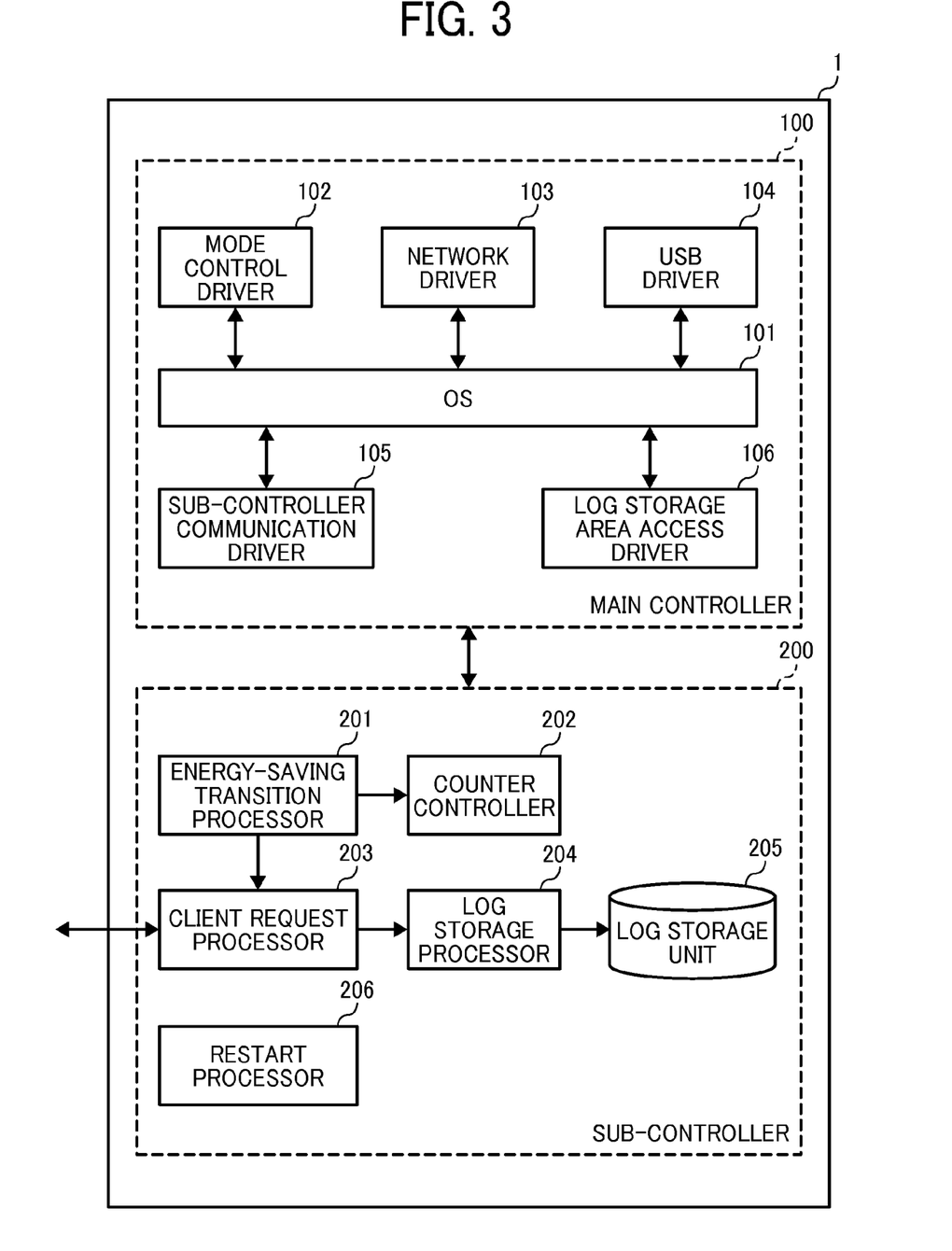
FIG. 3 is a block diagram illustrating a functional configuration of chief parts of the image forming apparatus as an embodiment of the present invention.

Next, a capability of controlling the apparatus in the energy-saving mode among capabilities included in the image processing apparatus 1 in this embodiment related is described below with reference to FIG. 3. FIG. 3 is a block diagram illustrating a functional configuration related to the energy-saving control among capabilities included in the image forming apparatus 1 in this embodiment. As shown in FIG. 3, the image forming apparatus 1 in this embodiment consists of a main controller 100 controlled by the main CPU 11 in the normal mode in which the main CPU 11 is powered and a sub-controller 200 controlled by the sub-CPU 31 in the energy-saving mode in which the main CPU 11 is not powered.

That is, the main CPU 11 and the main controller 100 stop working in the energy-saving mode and together function as an apparatus controller that controls the image forming apparatus 1 in the normal mode. The sub-CPU 31 and the sub-controller 200 together function as an energy-saving mode controller that controls the image forming apparatus 1 in the energy-saving mode.

The main controller 100 includes an OS 101, a mode control driver 102, a network driver 103, a USB driver 104, a sub-controller communication driver 105, and a log storage area access driver 106. The sub-controller 200 includes an energy-saving transition processor 201, a counter controller 202, a client request processor 203, a log storage processor 204, a log storage unit 205, and a restart processor 206.

The OS 101 is an operating system that controls the entire image forming apparatus 1 by the main CPU 11 in the normal mode. The mode control driver 102 is a software module that transitions to the energy-saving mode if it is instructed to transition to the energy-saving mode by user operation and the image forming apparatus 1 is not operated for a certain period of time and recovers from the energy-saving mode by being notified of a recovery event from the energy-saving mode (e.g., hardware interruption) (described later in detail with reference to FIG. 9).

The network driver 103 is a software module for communicating with other devices such as the client device 2 via a network such as Ethernet and LAN. The network driver 103 acquires network setting information in accordance with a request by the mode control driver 102.

Figure 4:
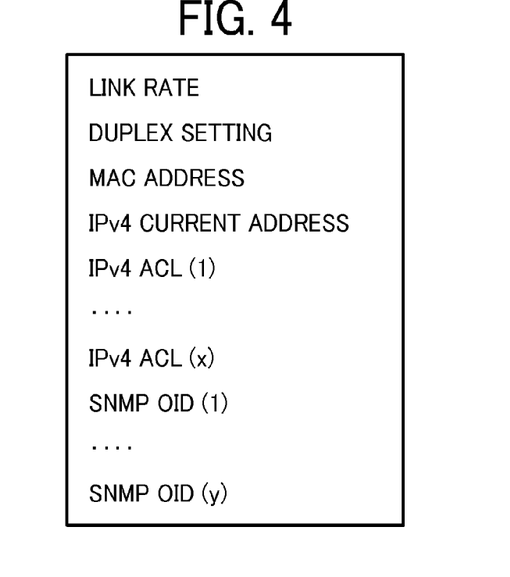
FIG. 4 is a diagram illustrating a list of settings included in network setting information as an embodiment of the present invention.

FIG. 4 is a diagram illustrating a list of settings included in the network setting information in this embodiment. As shown in FIG. 4, the settings included in the network setting information include link speed (e.g., "auto", "10 Mbps", and "100 Mbps"), duplex setting (e.g., "half duplex" and "full duplex"), Media Access Control (MAC) address, Internet Protocol version 4 (IPv4) current address, IPv4 Access Control List (ACL) from (1) to (x), and Simple Network Management Protocol (SNMP) Object Identifier (OID) from (1) to (y) for example.

The USB driver 104 is a software module for communicating with other devices such as the client device 2 via a USB cable. The USB driver 104 acquires USB setting information in accordance with a request by the mode control driver 102.

The sub-controller communication driver 105 is a software module for communicating with the energy-saving transition processor 201 in the sub-controller 200 in transitioning to the energy-saving mode in accordance with a request by the mode control driver 102. In addition, the log storage area access driver 106 is a software module for accessing a storage area that the main CPU 11 and the sub-CPU 31 can share. The sharable storage area is described in detail later with reference to FIGS. 7 and 8.

The energy-saving transition processor 201 communicates with the sub-controller communication driver 105 and transitions to the energy-saving mode (described in detail later with reference to FIG. 9). The counter controller 202 controls the watchdog timer 32 in accordance with the operating mode of the image forming apparatus 1. By controlling the watchdog timer 32 by the counter controller 202, the sub-controller 200 is restarted if the sub-controller 200 malfunctions.

If the sub-controller 200 malfunctions, any one of the sub-CPU 31 that controls the sub-controller 200, the SRAM 35 as the working area of the sub-CPU 31, and any one of units included in the sub-controller 200 stalls or has some trouble. To restart the sub-controller 200 also means that the sub-CPU 31 and the SRAM 35 are restarted.

The client request processor 203 performs processing in response to the request by the client device 2. More specifically, after the client request processor 203 receives a ping request by the client device 2 via the NIC 33 for example, if the IP address specified in the received ping request corresponds to its IP address, the client request processor 203 replies to the client device 2 that sent the ping request. Otherwise, the client request processor 203 ignores the request. It is determined whether or not the IP address specified in the request corresponds to its IP address based on the network setting information that the mode control driver 102 acquires (described in detail later).

Each time the client request processor 203 finishes processing, the log storage processor 204 stores the processing result in the log storage unit 205 as log information (history). The log storage unit 205 is a sharable storage device that the log storage area access driver 106 in the main controller 100 and the log storage processor 204 can share. An example of the log storage unit 205 is a storage area allocated to the SRAM 35 (described in detail later with reference to FIG. 7 and FIG. 8).

After the watchdog timer 32 restarts the sub-controller 200, the restart processor 206 performs processing in accordance with the restart. More specifically, after the sub-controller 200 restarts, the restart processor 206 performs processing for recovering from the energy-saving mode to the normal mode such as sending the recover event from the energy-saving mode to the normal mode to the mode control driver 102 etc.

In addition, the restart processor 206 transfers a notification of recovery that indicates the recovery from the energy-saving mode to the normal mode due to the malfunction in the sub-controller 200 in the energy-saving mode.

Figure 5:
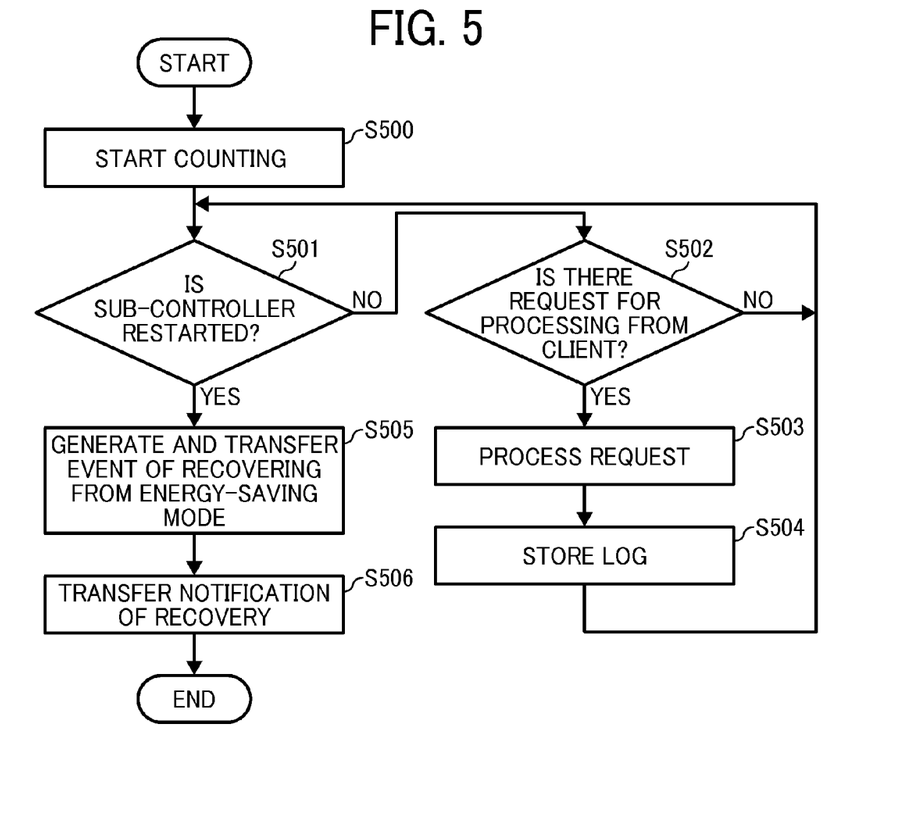
FIG. 5 is a flowchart illustrating a process performed by each unit in a sub-controller as an embodiment of the present invention.

Here, processes in each unit in the sub-controller 200 described above is described below with reference to a flowchart. FIG. 5 is a flowchart illustrating a process performed by each unit in the sub-controller 200. In case of starting transitioning to the energy-saving mode, as shown in FIG. 5, the counter controller 202 starts the watchdog timer 32 after the energy-saving transition processor 201 notifies the counter controller 202 of starting transitioning to the energy-saving mode in S500.

If the watchdog timer 32 does not restart the sub-controller 200 (NO in S501) and there is no request by the client device 2 (NO in S502), the client request processor 203 stands by.

By contrast, if the watchdog timer 32 does not restart the sub-controller 200 (NO in S501) and there is a request by the client device 2 (YES in S502), the client request processor 203 performs processing that the client device 2 requests in S503. After finishes processing requested by the client device 2, the log storage processor 204 stores the processing result in the log storage unit 205 as the log information in S504, and the client request processor 203 returns to the standby state.

Otherwise, if the watchdog timer 32 restarts the sub-controller 200 (YES in S501), the restart processor 206 generates the recovery event from the energy-saving mode and transfers the event to the mode control driver 102 in S505. After receiving the recovery event and transitioning from the energy-saving mode to the normal mode, the restart processor 206 transfers the notification of recovery to the mode control driver 102 in S506.

Figure 6:
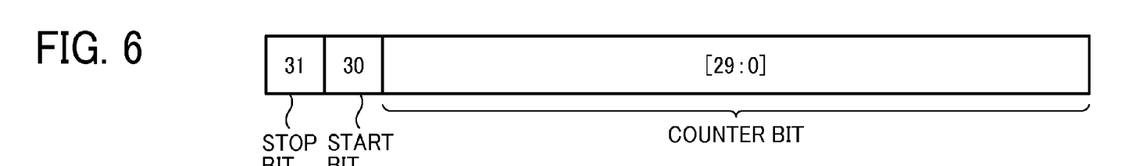
FIG. 6 is a conceptual diagram illustrating a watchdog timer as an embodiment of the present invention.

The watchdog timer 32 and the counter controller 202 are described below in detail. FIG. 6 is a conceptual diagram illustrating the watchdog timer 32. As shown in FIG. 6, the 30th bit is a start bit, for example. If the image forming apparatus 1 transitions to the energy-saving mode, the counter controller 202 turns the start bit from 0 to 1 and starts the watchdog timer 32. As shown in FIG. 6, the 31st bit is a stop bit for example. If the image forming apparatus 1 recovers from the energy-saving mode to the normal mode, the counter controller 202 turns the stop bit from 0 to 1 and stops the watchdog timer 32.

As shown in FIG. 6, bits from the top to the 29th bit are counter bits, and predetermined period of time (e.g., 20 seconds) is preset as a counter value. After starting running, the watchdog timer 32 counts down in accordance with an input clock of the ASIC and elapsed time input from an external clock. If the counter value of the counter bits become 0, i.e., the predetermined time elapses, the watchdog timer 32 restarts the sub-controller 200.

In this case, if the counter controller 202 receives information that an application to be monitored outputs (e.g., execution completed signal) at a cycle shorter than counting down a value set to the watchdog timer 32 (e.g., by 10 seconds), the counter controller 202 resets the counter bits in the watchdog timer 32. That is, if the application to be monitored transfers the signal regularly, that means that the sub-controller 200 is working normally. Therefore, it is started to count down from the first after the counter bits are reset, the sub-controller 200 is not restarted.

As described above, the watchdog timer 32 functions as a restart controller that restarts the energy-saving mode controller that works in the energy-saving mode each time the predetermined value is counted. If the energy-saving mode controller works normally, the counter controller 202 included in the energy-saving mode controller controls the restart controller so that the restart controller does not restart the energy-saving mode controller by resetting the count value in the restart controller at a cycle shorter than counting down the predetermined value. In this embodiment, it should be noted that the case that the counter value is counted down is taken as an example. However, it is possible to count up the counter value from 0, and it is possible to consider that the predetermined time elapses if the counter value reaches the predetermined value.

Figure 7:
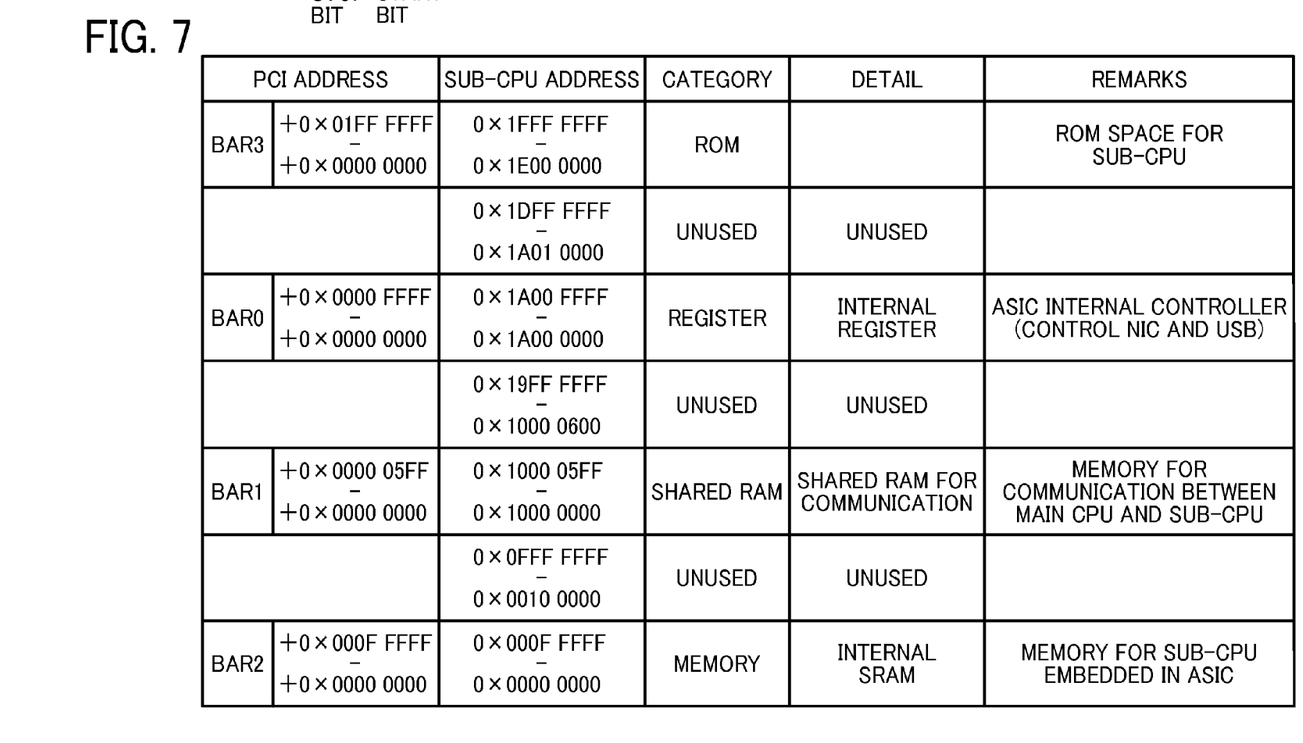
FIG. 7 is a diagram illustrating area information allocated for memory space of PCI bus and sub-CPU as an embodiment of the present invention.

Next, the log storage unit 205 that the main CPU 11 and the sub-CPU 31 can share is described in detail below. FIG. 7 is a diagram illustrating area information allocated for memory space of Peripheral Component Interconnect (PCI) bus connected to the main CPU 11 and memory space of the sub-CPU 31.

For example, as shown in FIG. 7, the SRAM 35 that is memory for the sub-CPU 31 embedded in the ASIC 30 is allocated to addresses "0x00000000" to "0x000FFFFF" in the memory space of the sub-CPU 31 (hereinafter referred to as "memory address"). In addition, the SRAM 35 is allocated to addresses "±0x0000000" to "+0x000FFFFF" from the top address in the memory space of the PCI bus, and it is possible to refer to the SRAM 35 as Base Address Register (BAR2) space.

Figure 8:
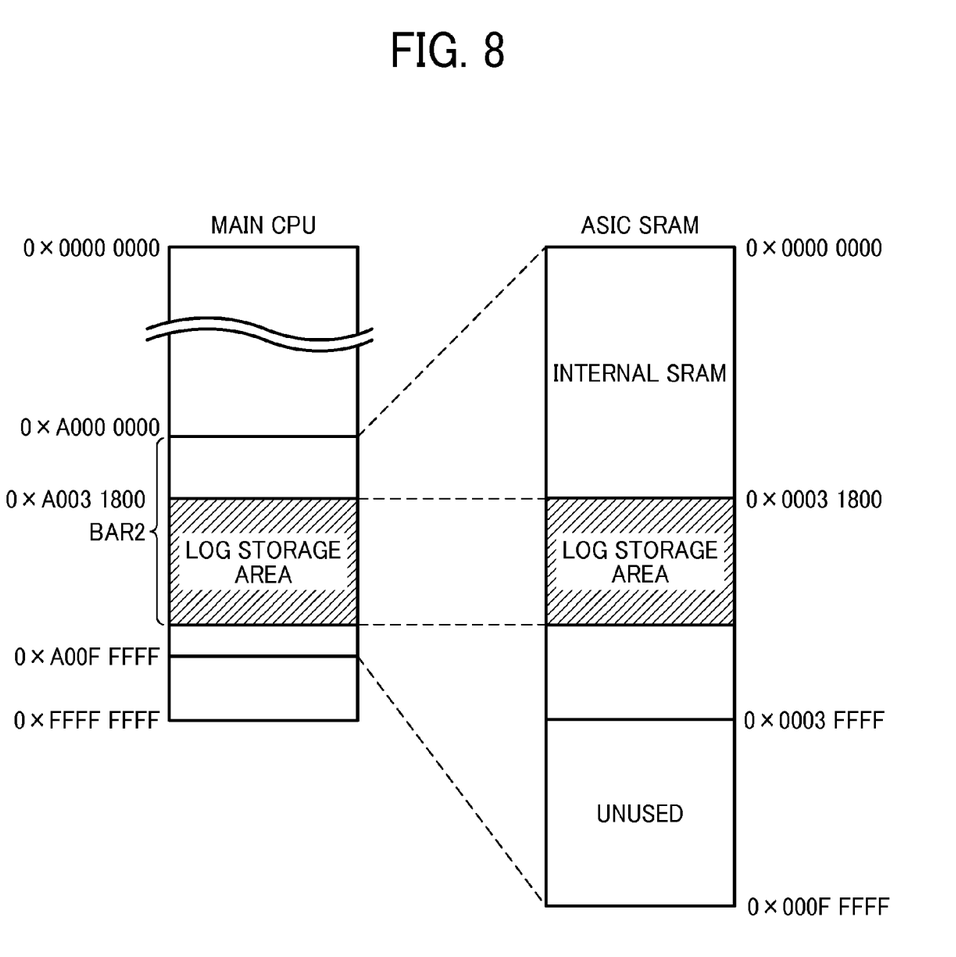
FIG. 8 is a diagram illustrating association between memory address allocated to SRAM and memory address of main CPU as an embodiment of the present invention.

FIG. 8 is a diagram illustrating association between memory address allocated to the SRAM 35 and memory address of the main CPU (PCI bus). For example, as shown in FIG. 8, the SRAM 35 allocated to the memory address in the memory space of the sub-CPU 31 "0x00000000" to "0x000FFFFF" is allocated to the memory address of the main CPU 11 (PCI bus) from "0xA0000000" to "0xA00FFFFF".

In addition, for example, as shown in FIG. 8, an area whose size is predetermined (e.g., 20 KB) starting with the memory address "0x00031800" in the memory space of the sub-CPU 31 is allocated as a log storage area (e.g., a ring buffer area), that is, as the log storage unit 205. That is, the main CPU 11 can refer to information stored in the log storage unit 205 by referring to the area whose size is 20 KB starting with the memory address "0xA0031800" of the PCI bus. As described above, the restart of the sub-controller 200 also means the restart of the SRAM 35. However, since power is not stopped to the SRAM 35 even if the SRAM 35 is restarted, the log information stored in the log storage area in FIG. 8 is not erased.

Next, the energy-saving control of each unit of the main controller 100 and the sub-controller 200 is described below with reference to a sequence diagram. FIGS. 9 and 10 are sequence diagrams illustrating the energy-saving control of each unit of the main controller 100 and the sub-controller 200. More specifically, FIG. 9 is the sequence diagram illustrating the operation until transitioning to the energy-saving mode, and FIG. 10 is the sequence diagram illustrating the operation after transitioning to the energy-saving mode to recovering from the energy-saving mode due to the malfunction in the sub-controller 200 in the energy-saving mode.

Figure 9:
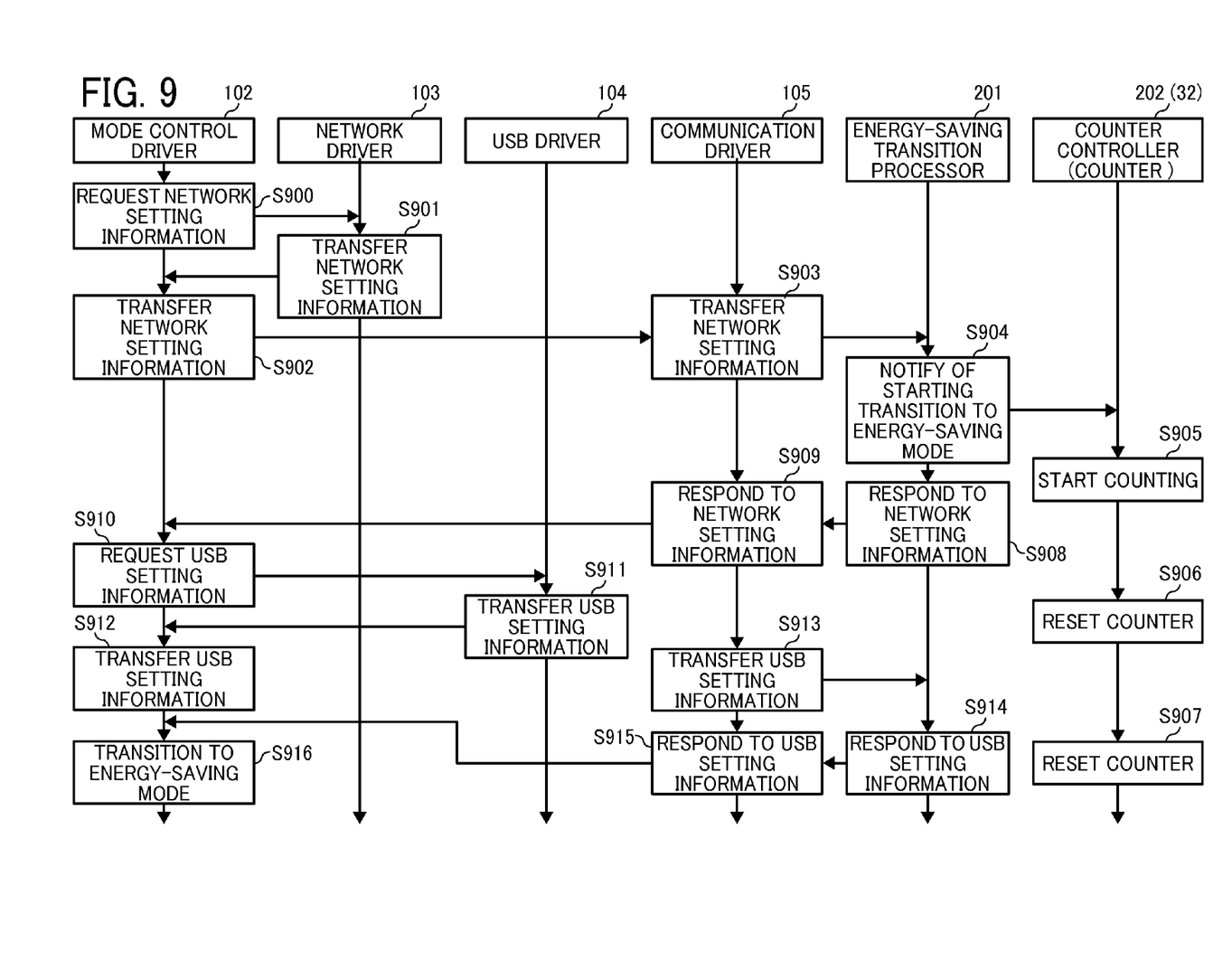
FIG. 9 is a sequence diagram illustrating the energy-saving control of each unit of the main controller and sub-controller as an embodiment of the present invention.
Figure 10:
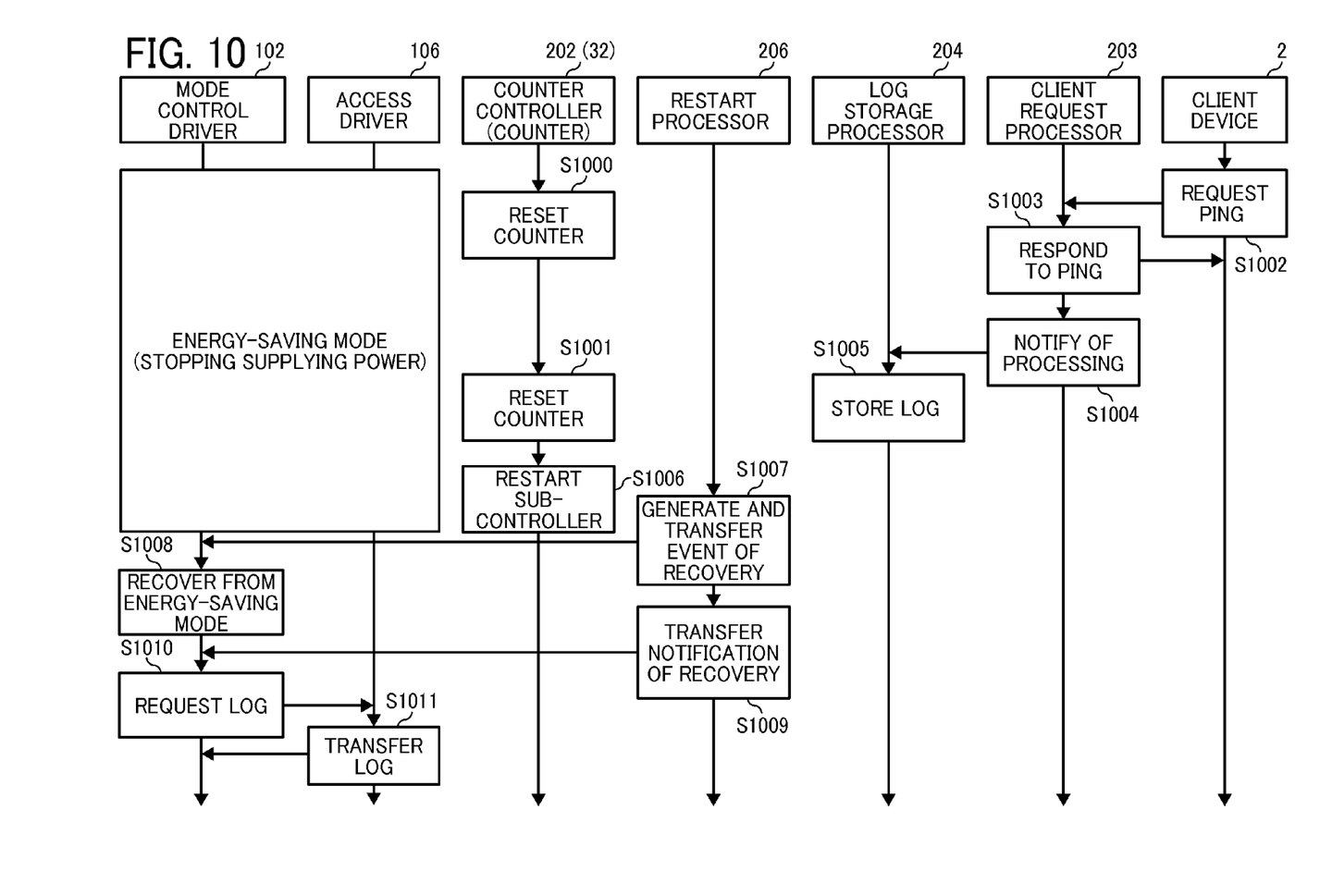
FIG. 10 is a sequence diagram illustrating the energy-saving control of each unit of the main controller and sub-controller as an embodiment of the present invention.

As shown in FIG. 9, the mode control driver 102 requests the network driver 103 to transfer the network setting information if it is instructed to transition to the energy-saving mode by user operation or the image forming apparatus 1 is not operated for a certain period of time in S900. After being requested to transfer the network setting information, the network driver 103 acquires the network setting information including the settings in FIG. 4 and transfers it to the mode control driver 102 in S901.

After receiving the network setting information transferred by the network driver 103, the mode control driver 102 transfers the received network setting information to the sub-controller communication driver 105 in S902. After receiving the network setting information, the sub-controller communication driver 105 transfers the received network setting information to the energy-saving transition processor 201 in the sub-controller 200 in S903.

After receiving the network setting information transferred by the sub-controller communication driver 105, the energy-saving transition processor 201 notifies the counter controller 202 that it is started to transition to the energy-saving mode in S904. After receiving the notification of starting transitioning to the energy-saving mode, the counter controller 202 starts the watchdog timer 32 in S905.

After starting the watchdog timer 32, if the counter controller 202 receives information that an application to be monitored outputs regularly (e.g., each 10 seconds), the counter controller 202 resets the counter in the watchdog timer 32 in S906 and S907.

By contrast, the energy-saving transition processor 201 replies to the sub-controller communication driver 105 regarding the received network setting information transferred by the sub-controller communication driver 105 in S908. In addition, the sub-controller communication driver 105 transfers the reception response transferred by the energy-saving transition processor 201 to the mode control driver 102 in S909.

Furthermore, the mode control driver 102 requests the USB driver 104 to transfer the USB setting information in S910. After being requested to transfer the USB setting information, the USB driver 104 acquires the USB setting information and transfers it to the mode control driver 102 in S911.

After receiving the USB setting information transferred by the USB driver 104, the mode control driver 102 transfers the received USB setting information to the sub-controller communication driver 105 in S912. After receiving the USB setting information, the sub-controller communication driver 105 transfers the received USB setting information to the energy-saving transition processor 201 in the sub-controller 200 in S913.

After receiving the USB setting information transferred by the sub-controller communication driver 105, the energy-saving transition processor 201 replies to the sub-controller communication driver 105 regarding the received USB setting information in S914. In addition, the sub-controller communication driver 105 transfers the reception response transferred by the energy-saving transition processor 201 to the mode control driver 102 in S915.

After receiving the reception response transferred by the energy-saving transition processor 201 regarding the received network setting information and the received USB setting information, the mode control driver 102 stops supplying power to the main controller 100 and transitions to the energy-saving mode in S916.

After transitioning to the energy-saving mode, it is stopped to supplying power to each unit in the main controller 100 such as the mode control driver 102 and the log storage area access driver 106 (hereinafter referred to as "access driver 106") as shown in FIG. 10. By contrast, the counter controller 202 keeps working and resets the counter in the watchdog timer 32 regularly while the application to be monitored keeps outputting information regularly in S1000 and S1001.

In the energy-saving mode that the counter in the watchdog timer 32 is reset regularly, i.e., the sub-controller 200 is working normally, the client device 2 transfers a request for processing such as ping request to the client request processor 203 in the sub-controller 200 in S1002. After receiving the ping request by the client device 2, the client request processor 203 performs a replying process in accordance with the request by the client device 2 in S1003.

After finishing replying to the ping request, the client request processor 203 notifies the log storage processor 204 of the finished processing result in S1004. After receiving the processing result obtained by the client request processor 203, the log storage processor 204 stores the processing result transferred by the client request processor 203 in the log storage unit 205 as log information in S1005.

Here, since the counter in the watchdog timer 32 is not reset even after the predetermined time elapses if the sub-controller 200 malfunctions, the watchdog timer 32 restarts the sub-controller 200 in S1006.

If the sub-controller 200 is restarted, the restart processor 206 generates the recovery event from the energy-saving mode and transfers the event to the mode control driver 102 in S1007. After receiving the interrupting notification by the recovery event, the mode control driver 102 recovers from the enemy-saving mode and performs the recovering process from the energy-saving mode such as starting supplying power to each unit in the main controller 100 again etc. in S1008.

After recovering from the energy-saving mode and transitioning to the normal mode, the restart processor 206 transfers the notification of recovery to the mode control driver 102 in S1009. After recovering from the energy-saving mode, the mode control driver 102 requests the access driver 106 to transfer the log information stored during the energy-saving mode in S1010.

After being requested to transfer the log information, the access driver 106 acquires the log information stored in the log storage unit 205 by accessing the log storage unit 205 as the sharable storage area in the SRAM 35 and transfers it to the mode control driver 102 in S1011. It should be noted that the acquired log information can be displayed listing on the LCD 17 in the image forming apparatus 1, or the acquired log information can be reported to the administrator etc. by sending e-mail.

The processing order in the sequence diagram in FIGS. 9 and 10 is just an example, and it is not necessarily the case that it is processed at the timing shown in FIGS. 9 and 10. For example, in the sequence diagram in FIG. 9, after the energy-saving transition processor 201 notifies the counter controller 202 that it is started to transition to the energy-saving mode, the sub-controller communication driver 105 transfers the USB setting information to the energy-saving transition processor 201. However, the sub-controller communication driver 105 can transfer the network setting information and the USB setting information to the energy-saving transition processor 201 at the same time, and after receiving the setting information, the energy-saving transition processor 201 can notify the counter controller 202 that it is started to transition to the energy-saving mode.

In other cases, for example, the counter in the watchdog timer 32 can be reset at the timing different from the timing in FIGS. 9 and 10, and other configuration units can be processed at the timing different from the timing in FIGS. 9 and 10. That is, while the counter is reset regularly, other configuration units perforin processing at the independent timings, and client device 2 repeats transferring requests a number of times in some cases.

As described above, in this embodiment, the watchdog timer 32 that works in the energy-saving mode of the image forming apparatus 1 monitors the operating mode of the image forming apparatus 1, and the sub-controller 200 is restarted if the sub-controller 200 malfunctions. As a result, if the energy-saving mode controller that controls the informa-tion processing apparatus such as the image forming apparatus 1 in the energy-saving mode has a trouble, it is possible to restart the energy-saving mode controller only without resetting the whole apparatus such as a system reset. Consequently, the controller that controls the information processing apparatus in the energy-saving mode is kept to normally operate at lower cost than before.

In addition, in this embodiment, the sub-controller 200 restarts if the watchdog timer 32 has started and period of time more than the predetermined period of time elapses. As a result, since it is possible to restart the sub-controller 200 by detecting malfunction within the predetermined period of time even in the enemy-saving mode, it is possible to recover the information processing apparatus to the normal mode immediately if the trouble occurs in the energy-saving mode.

In addition, in this embodiment, each time client request processing finishes, the sub-controller 200 that works in the energy-saving mode stores the finished processing result in the sharable storage area that the main CPU 11 and the sub-CPU 31 can share as the log information. In addition, after restarting the sub-controller 200 and starting supplying power to the main controller 100 again, the main controller 100 acquires the log information stored in the sharable storage area in the energy-saving mode. In the conventional technologies, since history at occurring a trouble is stored in a RAM as a sharable memory after detecting a malfunction, it is possible that the history cannot be stored in the RAM normally due to the system malfunction in the first place. On the other hand, as described above, the main controller 100 in this embodiment can acquire the log information stored in the sharable storage area normally before the trouble occurs.

In addition, as described above, since it is possible to recover the information processing apparatus to the normal mode immediately if the trouble occurs in the energy-saving mode, the main controller 100 can acquire the log information at an early stage after the trouble occurs, and it is possible to analyze the trouble etc. based on the log information more precisely. It should be noted that, in the embodiment described above, the case that the sharable storage area is allocated to the SRAM 35 as the work area of the sub-CPU 31 is described. However, that is just an example, and it is possible to utilize an external RAM that the main CPU 11 and the sub-CPU 31 can share. Otherwise, it is possible to utilize a sharable nonvolatile storage device.

It should be noted that the configuration regarding storing the log information in the sharable storage area is unnecessary in this embodiment. Even if the configuration regarding storing the log information is omitted, it is possible to keep the controller that controls the information processing apparatus working in energy-saving mode normally at lower cost than before.

In addition, in the embodiment described above, the case that the main controller 100 acquires the log information stored in the SRAM 35 as the volatile storage device and utilizes the log information for analyzing the log etc. is taken as an example. In addition to the embodiment described above, the configuration that the main controller 100 includes a HDD driver 107 as a software module that reads/writes data from/in the HDD as the nonvolatile storage device that the main controller 100 can refer can be considered.

Figure 11:
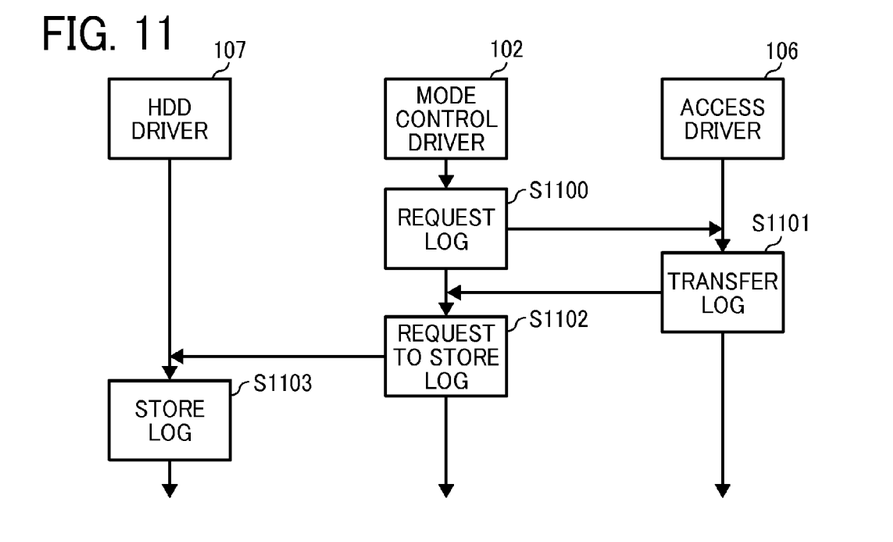
FIG. 11 is a sequence diagram illustrating the operation of acquiring log information after each unit of the main controller recovers from energy-saving state to normal state as an embodiment of the present invention.

FIG. 11 is a sequence diagram illustrating the operation of each unit of the main controller 100 regarding acquiring the log information after recovering from energy-saving state to normal state. As shown in FIG. 11, after recovering from the energy-saving mode because the sub-controller 200 has a trouble, the mode control driver 102 requests the access driver 106 to transfer the log information stored during the energy-saving mode in S1100 just like the case in S1010 in FIG. 10.

After being requested to transfer the log information, the access driver 106 acquires the log information stored in the log storage unit 205 by accessing the log storage unit 205 and transfers it to the mode control driver 102 in S1101. After acquiring the log information, the mode control driver 102 requests the HDD driver 106 to store the acquired log information in the HDD 14 in S1102. After being requested by the mode control driver 102, the HDD driver 107 stores the log information acquired by the mode control driver 102 in the HDD 14 in S1103.

By adopting the configuration described above, since the log information stored in the SRAM 35 as the volatile storage device is stored in the HDD 14 as the nonvolatile storage device, even if it is stopped to supply power and the information stored in the SRAM 35 is erased, it is possible to analyze log etc. using the log information stored in the HDD 14.

In addition, the configuration that the main controller 100 includes a debugger 108 for debugging if a part of the main controller 100 has a trouble and the debugger 108 utilizes the log information stored in the SRAM 35 can be considered. That is, the debugger 108 functions as an analysis unit for analyzing the status of the apparatus controller.

Figure 12:
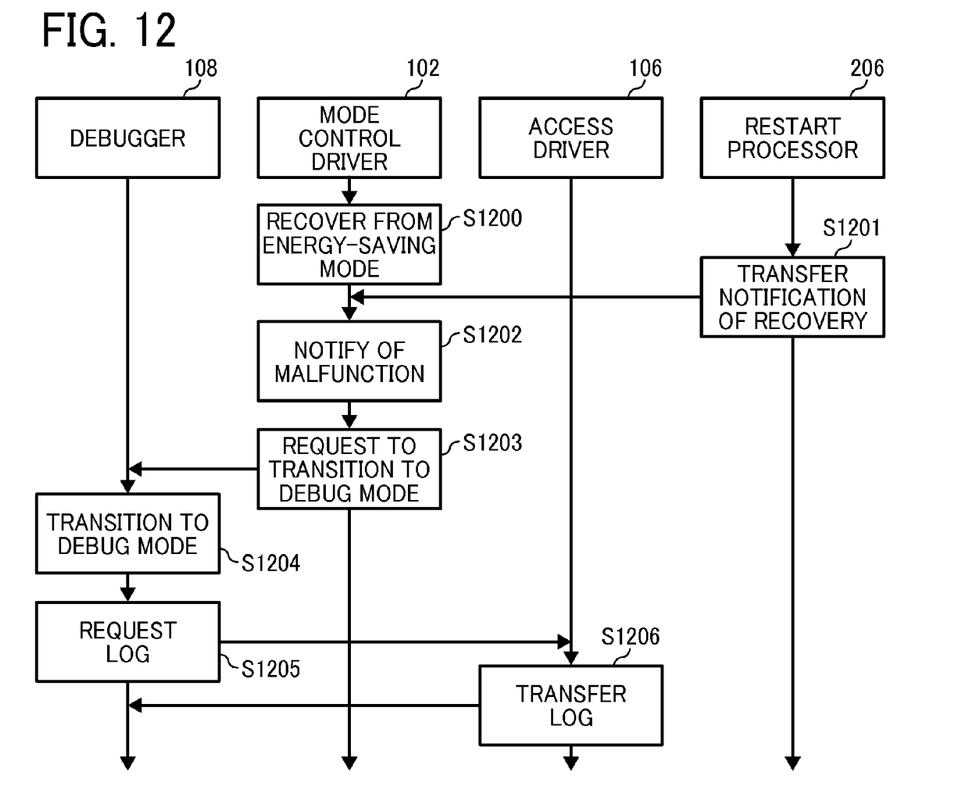
FIG. 12 is a sequence diagram illustrating the operation of each unit of the main controller and the sub-controller after the sub-controller restarts as an embodiment of the present invention.

FIG. 12 is a sequence diagram illustrating the operation of each unit in the main controller 100 and the sub-controller 200 after restarting the sub-controller 200. As shown in FIG. 12, if the sub-controller 200 has a trouble and the watchdog timer 32 restarts the sub-controller 200, after receiving the recovery event transferred by the restart processor 206, the mode control driver 102 recovers from the energy-saving mode and performs the recovering process from the energy-saving mode such as starting supplying power to each unit in the main controller 100 again etc. in S1200 just like the case in S1008 shown in FIG. 10.

After recovering from the energy-saving mode and transitioning to the normal mode, the restart processor 206 transfers the notification of recovery to the mode control driver 102 in S1201. After recovering from the enemy-saving mode, the mode control driver 102 detects the trouble such as malfunction in the part of the main controller 100 in S1202. After detecting the trouble in the main controller 100, the mode control driver 102 requests the debugger 108 to transition to a debug mode in S1203.

After receiving the request by the mode control driver 102, the debugger 108 transitions to the debug mode by displaying a debug screen on the LCD 17 etc. in S1204. After transitioning to the debug mode, the debugger 108 requests the access driver 106 to transfer the log information stored during the energy-saving mode in S1205.

After being requested to transfer the log information, the access driver 106 acquires the log information stored in the log storage unit 205 by accessing the log storage unit 205 and transfers it to the mode control driver 102 in S1206. By adopting the configuration described above, since it is possible to perform debugging including the log information stored in the energy-saving mode, it is possible to perform debugging more precisely.

In addition, it is possible to adopt an embodiment combining the configuration performing the operation shown in FIGS. 11 and 12. In this case, for example, after the debugger 108 acquires the log information, the HDD driver 107 stores the acquired log information in the HDD 14. Otherwise, if the HDD driver 107 stores the log information in the HDD 14 before detecting the trouble in the main controller 100, the debugger 108 can acquire the log information stored in the HDD 14.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An information processing apparatus, comprising:
a main central processing unit configured to control operation of the information processing apparatus in a normal operating mode;
a sub-central processing unit configured to control operation of the information processing apparatus in an energy-saving mode;
an energy-saving mode controller to control the information processing apparatus in an energy-saving mode; and
a restart controller that operates in the energy saving mode to restart the energy-saving mode controller each time a predetermined count value is counted using a counter of the restart controller;
wherein the energy-saving mode controller resets the counter in the restart controller based on information output in a shorter cycle than counting of the predetermined count value by the counter in accordance with an operating mode of the information processing apparatus.

2. The information processing apparatus according to claim 1, further comprising an apparatus controller to stop working in the energy-saving mode and control the information processing apparatus in a normal mode in which power to is supplied to the entire information processing apparatus,
wherein the energy-saving mode controller performs processing in response to a request from another information processing apparatus and stores processing history in a sharable storage device that the energy-saving mode controller and the apparatus controller can share each time the energy-saving mode controller finishes processing.

3. The information processing apparatus according to claim 2, wherein the apparatus controller includes one of multiple processing units, and the energy-saving mode controller includes one of the multiple processing units other than the processing unit of the apparatus controller.

4. The information processing apparatus according to claim 3, wherein the processing unit of the energy-saving mode controller consumes less power than the other processing unit of the apparatus controller.

5. The information processing apparatus according to claim 2, wherein the energy-saving mode controller returns from the energy-saving mode to the normal mode by being restarted, and the apparatus controller acquires the processing history stored in the sharable storage device during the energy-saving mode upon returning to the normal mode.

6. The information processing apparatus according to claim 5, wherein the apparatus controller stores the acquired processing history in a nonvolatile storage device that the apparatus controller can reference.

7. The information processing apparatus according to claim 5, wherein the apparatus controller activates an analysis unit that analyzes a status of the apparatus controller in case of trouble returning to the normal mode, to cause the started analysis unit to perform an analysis based on the acquired processing history.

8. A method of controlling an image processing apparatus including an energy-saving mode controller and a restart controller, the method comprising the steps of:
operating the information processing apparatus in an energy-saving mode;
restarting the energy-saving mode controller each time a predetermined count value is counted by a counter in a restart controller while in the energy-saving mode; and
resetting the counter based on information output in a shorter cycle than counting of the predetermined count value by the counter in accordance with an operating mode of the information processing apparatus.

9. A non-transitory, computer-readable recording medium storing a program that, when executed by a processor, causes the processor to implement a method of controlling an image processing apparatus including an energy-saving mode controller and a restart controller,
the method comprising the steps of:
operating the information processing apparatus in an energy-saving mode;
restarting the energy-saving mode controller each time a predetermined count value is counted by a counter in a restart controller while in the energy-saving mode; and
resetting the counter based on information output in a shorter cycle than counting of the predetermined count value by the counter in accordance with an operating mode of the information processing apparatus.

* * * * *